(12) United States Patent
Zhang et al.

(10) Patent No.: US 10,948,994 B2
(45) Date of Patent: Mar. 16, 2021

(54) GESTURE CONTROL METHOD FOR WEARABLE SYSTEM AND WEARABLE SYSTEM

(71) Applicant: Huawei Technologies Co., Ltd., Shenzhen (CN)

(72) Inventors: Liyao Zhang, Beijing (CN); Qiang Ding, Beijing (CN); Hongrui Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 288 days.

(21) Appl. No.: 16/080,589

(22) PCT Filed: Feb. 29, 2016

(86) PCT No.: PCT/CN2016/074822
§ 371 (c)(1),
(2) Date: Aug. 28, 2018

(87) PCT Pub. No.: WO2017/147748
PCT Pub. Date: Sep. 8, 2017

(65) Prior Publication Data
US 2019/0073041 A1    Mar. 7, 2019

(51) Int. Cl.
*G06F 3/01* (2006.01)
*G06F 1/16* (2006.01)
(Continued)

(52) U.S. Cl.
CPC ............ *G06F 3/017* (2013.01); *G06F 1/163* (2013.01); *G06F 3/01* (2013.01); *G06K 9/00355* (2013.01); *G06K 9/3233* (2013.01)

(58) Field of Classification Search
CPC .......... G06F 3/017; G06F 3/01; G06F 1/163; G06K 9/00355; G06K 9/3233
See application file for complete search history.

(56) References Cited

U.S. PATENT DOCUMENTS 8,179,604 B1 *   5/2012   Prada Gomez .... G02B 27/0093
                                                          359/630
2004/0201857 A1   10/2004  Foxlin
(Continued)

FOREIGN PATENT DOCUMENTS

CN         1648840 A         8/2005
CN       102799318 A        11/2012
(Continued)

OTHER PUBLICATIONS

Yang Liu et al, "A Robust Hand Tracking for Gesture-Based Interaction of Wearable Computers", Eighth International Symposium on Wearable Computers, 2004.*
(Continued)

*Primary Examiner* — Matthew Ell
(74) *Attorney, Agent, or Firm* — Slater Matsil, LLP

(57) ABSTRACT

When a location of a wearable system changes, the wearable system can ensure that a gesture working region always remains in a field of view of the wearable system. Therefore, the wearable system can still collect and recognize a gesture image and implement gesture control. The solution provided in this application is as follows: The wearable system creates a gesture working region and a region of interest, where the region of interest is within a shooting area of a first camera, and the first camera is included in a wearable device; obtains a location parameter of the wearable system; adjusts the region of interest according to the location parameter, so that the region of interest covers the gesture working region; collects a gesture image within the gesture working region; recognizes the gesture image to obtain a gesture instruction; and performs a corresponding operation according to the gesture instruction.

21 Claims, 4 Drawing Sheets

(51) Int. Cl.
   *G06K 9/00* (2006.01)
   *G06K 9/32* (2006.01)

(56) References Cited

U.S. PATENT DOCUMENTS

| | | |
|---|---|---|
| 2005/0151850 A1 | 7/2005 | Ahn et al. |
| 2010/0199232 A1* | 8/2010 | Mistry .................. G06F 3/0425 715/863 |
| 2012/0306725 A1 | 12/2012 | Hilkes |
| 2012/0326959 A1 | 12/2012 | Murthi et al. |
| 2012/0327116 A1 | 12/2012 | Liu et al. |
| 2013/0191741 A1 | 7/2013 | Dickinson et al. |
| 2014/0125813 A1 | 5/2014 | Holz |
| 2014/0306874 A1* | 10/2014 | Finocchio ............... G06F 3/017 345/156 |
| 2015/0062293 A1 | 3/2015 | Cho et al. |
| 2015/0235632 A1 | 8/2015 | Liu et al. |
| 2015/0277566 A1 | 10/2015 | Musgrave et al. |
| 2015/0355317 A1 | 12/2015 | Bridges et al. |
| 2015/0379238 A1* | 12/2015 | Connor ............... G06F 19/3475 702/19 |
| 2016/0162038 A1 | 6/2016 | Yang et al. |
| 2016/0328021 A1 | 11/2016 | Lee et al. |

FOREIGN PATENT DOCUMENTS

| | | |
|---|---|---|
| CN | 103067727 A | 4/2013 |
| CN | 103635849 A | 3/2014 |
| CN | 103941864 A | 7/2014 |
| CN | 103995592 A | 8/2014 |
| CN | 104679222 A | 6/2015 |
| CN | 105284057 A | 1/2016 |
| CN | 105323487 A | 2/2016 |
| EP | 2980741 A1 | 2/2016 |
| EP | 2820828 B1 | 10/2018 |
| WO | 2015111778 A1 | 7/2015 |

OTHER PUBLICATIONS

Masaki Maeda et al., "Tracking of user position and orientation by stereo measurement of infrared markers and orientation sensing.", Eighth International Symposium on Wearable Computers, 2004.*

* cited by examiner

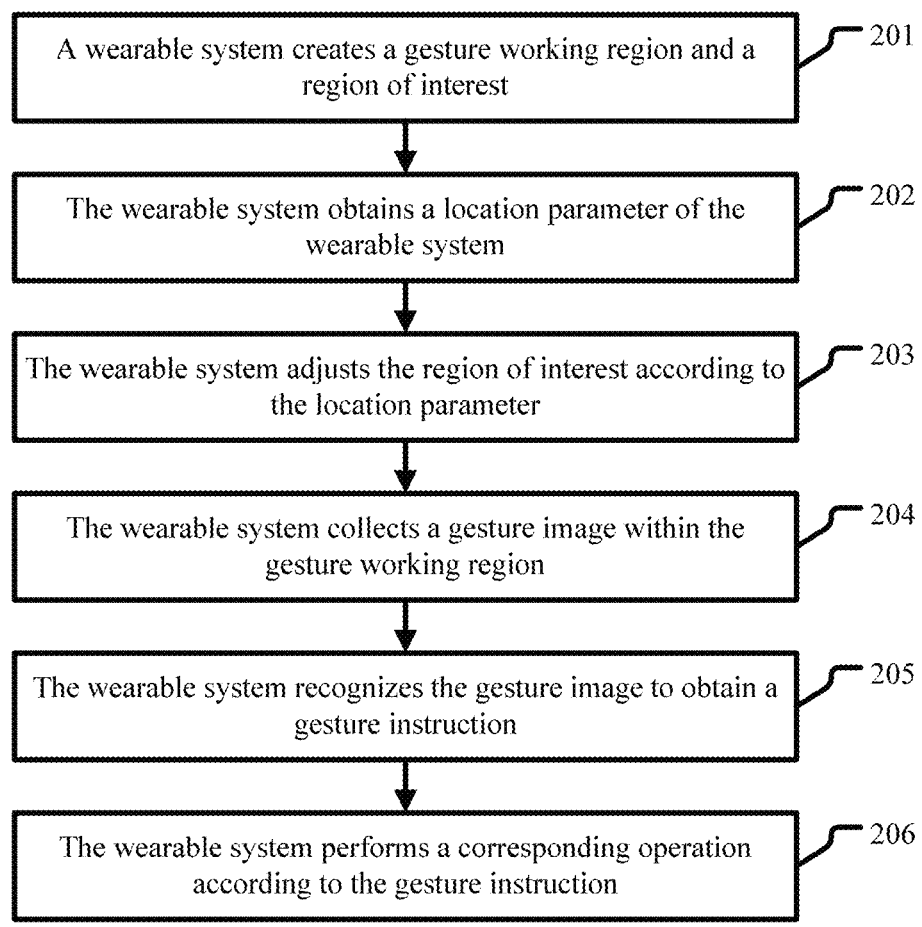

GESTURE CONTROL METHOD FOR WEARABLE SYSTEM AND WEARABLE SYSTEM

CROSS-REFERENCE TO RELATED APPLICATIONS

This application is a national stage of International Application No. PCT/CN2016/074822, filed on Feb. 29, 2016, which application is hereby incorporated herein by reference.

TECHNICAL FIELD

Embodiments of this application relate to the communications field, and in particular, to a gesture control method for a wearable system and a wearable system.

BACKGROUND

With popularity of wearable systems, control methods of the wearable systems are also changed from traditional keyboard-based and touchscreen-based control methods to a gesture control method. Compared with the keyboard-based and touchscreen-based control methods, the gesture control method has advantages such as a simple apparatus, easy control, and rich instructions, so that device design can be greatly simplified. At present, the gesture control method has become one of the most popular control methods for wearable systems, and has been gradually applied to various devices.

The current wearable system may determine a gesture image by using a camera to collect reflected infrared light or by using a camera to perform stereoscopic imaging on a gesture in natural light, so as to implement gesture control. However, the current wearable system is provided with a camera that is fixed relative to the wearable system. As a result, a shooting area of the camera is fixed.

Therefore, a field of view of the wearable system is fixed. When a location of the wearable system changes, the field of view of the wearable system also changes. Consequently, a gesture working region is beyond the field of view, and the wearable system cannot collect or recognize a gesture image for gesture control.

SUMMARY

Embodiments of this application provide a gesture control method for a wearable system and a wearable system. When a location of the wearable system changes, the wearable system can ensure that a gesture working region always remains in a region of interest of the wearable system. Therefore, the wearable system can still collect and recognize a gesture image and implement gesture control.

According to a first aspect, an embodiment of this application provides a gesture control method for a wearable system, including the following steps.

A wearable system creates a gesture working region and a region of interest, where the region of interest is within a shooting area of a first camera.

The region of interest in this embodiment of this application may be only a part of or the entire of the shooting area of the first camera of the wearable system. A specific creation method is not limited herein.

The wearable system obtains a location parameter of the wearable system.

In this embodiment of this application, the wearable system may obtain the location parameter of the wearable system in multiple manners. For example, the wearable system may use a gravity sensor, an acceleration transducer, a gyroscope, and/or the like to obtain location information of the wearable system. A specific manner is not limited herein.

The wearable system adjusts the region of interest according to the location parameter, so that the region of interest covers the gesture working region; collects a gesture image within the gesture working region, where the gesture image includes a static hand posture and/or a dynamic gesture motion; recognizes the gesture image to obtain a gesture instruction; and performs a corresponding operation according to the gesture instruction.

In the solution provided in this application, after creating the gesture working region and the region of interest, the wearable system obtains the location parameter of the wearable system, and adjusts the region of interest of the wearable system according to the location parameter, so that the region of interest can cover the gesture working region. The region of interest of the wearable system is within the shooting area of the first camera. When the location of the wearable system changes, the wearable system can ensure that the gesture working region always remains in the field of view of the wearable system. Therefore, the wearable system can still collect and recognize a gesture image and implement gesture control.

Optionally, a specific method used by the wearable system to adjust the region of interest according to the location parameter is as follows:

After obtaining a deviation angle of the wearable system, the wearable system calculates, according to the deviation angle, a first adjustment angle of the camera by using the first relation. The first relation is determined by the wearable system according to a first coordinate system, a second coordinate system, and a third coordinate system. The first coordinate system is created by the wearable system according to the gesture working region, the second coordinate system is created by the wearable system according to the region of interest, and the third coordinate system is created by the wearable system according to the wearable system itself. The wearable system adjusts, according to the first adjustment angle, an angle of a reflex mirror, and/or a shooting angle of the camera by using a rotary motor, so as to adjust the region of interest of the wearable system. In this embodiment of this application, the reflex mirror is configured to reflect an image in the region of interest of the wearable system into the shooting area of the camera of the wearable system.

In the embodiments of this application, the first coordinate system, the second coordinate system, and the third coordinate system that are created by the wearable system may be a Cartesian coordinate system, an Euler angle coordinate system, or another coordinate system, and no limitation is specifically set herein. In this embodiment of this application, the Cartesian coordinate system is used as an example. The first relation includes:

$$\frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta} - \frac{X_{c(i-2)}\sin\alpha_{i-1}\sin\beta_{i-1} + Y_{c(i-2)}\cos\alpha_{i-1} + Z_{c(i-2)}\sin\alpha_{i-1}\cos\beta_{i-1}}{X_{c(i-2)}\cos\beta_{i-1} - Z_{c(i-2)}\sin\beta_{i-1}} = \pm\gamma;$$

-continued $$\frac{a_{21}X_w + a_{22}Y_w + a_{23}Z_w + \Delta Y_{ew}}{a_{11}X_w + a_{12}Y_w + a_{13}Z_w + \Delta X_{ew}} = \frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta}; \text{ or}$$

$$a_{31}X_w + a_{32}Y_w + a_{33}Z_w + \Delta Z_{ew} = C,$$

where γ is a critical value of a to-be-adjusted region of interest, C is determined by using a proportion according to a size of the gesture image, and α and β are the first adjustment angles of the first camera, where α is an angle of rotation about an x axis, and f is an angle of rotation about a y axis; the first coordinate system is $O_w$-$X_w Y_w Z_w$, the second coordinate system is $O_c$-$X_c Y_c Z_c$, and the third coordinate system is $O_w$-$X_w Y_w Z_w$, where $(X_w, Y_w, Z_w)$ is a coordinate value of a point in the first coordinate system, $(X_e, Y_e, Z_e)$ is a coordinate value of a point of $(X_w, Y_w, Z_w)$ in the third coordinate system, $(X_{c(i-1)}, Y_{c(i-1)}, Z_{c(i-1)})$ is a coordinate value of a current imaging center point in the third coordinate system after the second coordinate system is rotated, and $(X_{c(i-2)}, Y_{c(i-2)}, Z_{c(i-2)})$ is a coordinate value of the current imaging center point in the third coordinate system before the second coordinate system is rotated; and $(\Delta X_{ew}, \Delta Y_{ew}, \Delta Z_{ew})$ are translational displacements along an x direction, a y direction, and a z direction when the first coordinate system switches to the third coordinate system, and $(a_{11}, a_{12}, a_{13}, a_{21}, a_{22}, a_{23}, a_{31}, a_{32}, a_{33})$ are determined by using the following formula:

$$R(\varepsilon_z)R(\varepsilon_y)R(\varepsilon_x) = \begin{bmatrix} \cos\varepsilon_y\cos\varepsilon_z & \cos\varepsilon_x\sin\varepsilon_z + \sin\varepsilon_x\sin\varepsilon_y\cos\varepsilon_z & \sin\varepsilon_x\sin\varepsilon_z - \cos\varepsilon_x\cos\varepsilon_y\cos\varepsilon_z \\ -\cos\varepsilon_y\sin\varepsilon_z & \cos\varepsilon_x\cos\varepsilon_z - \sin\varepsilon_x\sin\varepsilon_y\sin\varepsilon_z & \sin\varepsilon_x\cos\varepsilon_z + \cos\varepsilon_x\sin\varepsilon_y\sin\varepsilon_z \\ \sin\varepsilon_y & -\sin\varepsilon_x\cos\varepsilon_y & \cos\varepsilon_x\cos\varepsilon_y \end{bmatrix},$$

$$\text{simplified as } R(\varepsilon_z)R(\varepsilon_y)R(\varepsilon_x) = \begin{bmatrix} a_{11} & a_{12} & a_{13} \\ a_{21} & a_{22} & a_{23} \\ a_{31} & a_{32} & a_{33} \end{bmatrix},$$

where $(\varepsilon_x, \varepsilon_y, \varepsilon_z)$ are angles of rotation in the x direction, the y direction, and the z direction when the first coordinate system switches to the third coordinate system.

In the solution provided in this embodiment of this application, a manner of adjusting an installation angle of the reflex mirror and/or a manner of using the rotary motor to adjust the shooting angle of the camera are/is used to adjust the region of interest of the wearable system. In this way, the region of interest can be adjusted flexibly.

Optionally, when the wearable system tilts upward or downward, the wearable system obtains a tilting angle by using the location parameter. The tilting angle is used to indicate an upward deviation angle or a downward deviation angle of the wearable system.

The wearable system calculates, according to the tilting angle, a second adjustment angle of the camera by using a second relation. The second relation is determined by the wearable system according to the first coordinate system, the second coordinate system, and the third coordinate system.

The wearable system adjusts, according to the second adjustment angle, an angle of a reflex mirror, and/or a shooting angle of the camera by using a rotary motor, so as to adjust the region of interest. The reflex mirror is configured to reflect an image in a field of view of the wearable system into the shooting area of the camera.

The second relation is:

$$\phi = \sin^{-1}\{[X_{world} - d_x - \cos(\varphi-\theta)X_{camera} - \sin(\varphi-\theta)Z_{camera}]/1)\} - \varphi \text{ or}$$

$$\phi = \cos^{-1}\{[Z_{world} - d_z + \sin(\varphi-\theta)X_{camera} - \cos(\varphi-\theta)Z_{camera}]/1)\} - \varphi,$$

where $(X_{world}, Y_{world}, Z_{world})$ are coordinates of the gesture working region, $(X_{current}, Y_{current}, Z_{current})$ are coordinates of the region of interest, φ is the tilting angle, ϕ is the second adjustment angle, θ is a viewing angle of the region of interest, 1 is a length of the camera, $d_x$ is a vertical distance between the camera and the gesture working region, and $d_z$ is a horizontal distance between the camera and the gesture working region.

Optionally, during the gesture image collection process, the wearable system may also transmit, by using an infrared light transmitter of the wearable system, infrared light to cover the gesture working region; perform, by using an infrared cut-off filter, filtering to obtain infrared light reflected from the gesture working region; and receive the reflected infrared light by using the first camera and a second camera of the wearable system, where the second camera is included in the wearable system. After the first camera receives the reflected infrared light, the wearable system may generate a first gesture image, and after the second camera receives the reflected infrared light, the wearable system may generate a second gesture image. Then, the wearable system performs calculation on the first gesture image and the second gesture image to obtain the gesture image.

In this embodiment of this application, the wearable system may perform calculation such as coordinate transformation, stereo rectification, and stereo matching on the first gesture image and the second gesture image to obtain the gesture image.

In the solution provided in this embodiment of this application, the wearable system uses the infrared light transmitter of the wearable system to transmit infrared light to cover the gesture working region, so that a gesture signal can be enhanced. The wearable system uses the infrared cut-off filter to filter out stray light other than infrared light, so that image color processing is simplified. The wearable system uses dual cameras to collect a gesture image in a binocular vision manner, so that the obtained gesture image can contain image depth information, thereby improving gesture image recognition precision.

Optionally, during the gesture image collection process of the wearable system, the wearable system may detect in real time whether there is a light spot, formed from laser light transmitted by a laser provided in the first camera, in the collected gesture image. When there is no light spot in the gesture image, the wearable system may adjust the region of interest, so that there is a light spot in a new gesture image collected by the wearable system, to implement real-time tracking.

In the solution provided in this embodiment of this application, when there is no light spot, formed from laser light transmitted by the laser, in the gesture image, the wearable system adjusts the region of interest, to enable the first camera to perform precise gesture tracking and alignment, further improving a tracking capability and recognition precision.

According to a second aspect, an embodiment of this application provides a wearable system. The wearable system has functions of implementing the functions of the wearable system in the foregoing method. The functions may be implemented by using hardware, or may be implemented by hardware executing corresponding software. The hardware or the software includes one or more modules corresponding to the foregoing functions.

The wearable system includes a first camera, a sensor, a processor, and a bus.

The first camera, the sensor, and the processor are connected by using the bus.

The sensor is included in the wearable system.

The processor is included in the wearable system.

The processor creates a gesture working region, and creates a region of interest according to the gesture working region. The region of interest is included in a shooting area of a first camera, and the first camera is included in the wearable system.

The sensor obtains a location parameter of the wearable system.

The processor adjusts the region of interest according to the location parameter obtained by the sensor, so that the region of interest covers the gesture working region.

The first camera collects a gesture image within the gesture working region. The gesture image includes a static hand posture and/or a dynamic gesture motion.

The processor recognizes the gesture image collected by the first camera, to obtain a gesture instruction, and performs a corresponding operation according to the gesture instruction.

According to a third aspect, a computer storage medium is provided. The computer storage medium stores program code, and the program code is used to execute the method in the first aspect.

Beneficial effects of the solutions in this application are as follows:

In the solutions provided in this application, after creating the gesture working region and the region of interest, the wearable system obtains the location parameter of the wearable system, and adjusts the region of interest of the wearable system according to the location parameter, so that the region of interest can cover the gesture working region, where the region of interest is within the shooting area of the first camera. When the location of the wearable system changes, the wearable system can ensure that the gesture working region always remains in the field of view of the wearable system. Therefore, the wearable system can still collect and recognize a gesture image and implement gesture control.

BRIEF DESCRIPTION OF THE DRAWINGS

FIG. 1 is a schematic diagram of a system architecture of a wearable system according to an embodiment of this application;

FIG. 2 is a schematic diagram of an embodiment of a gesture control method of a wearable system according to embodiments of this application;

DETAILED DESCRIPTION OF ILLUSTRATIVE EMBODIMENTS

Figure 3:
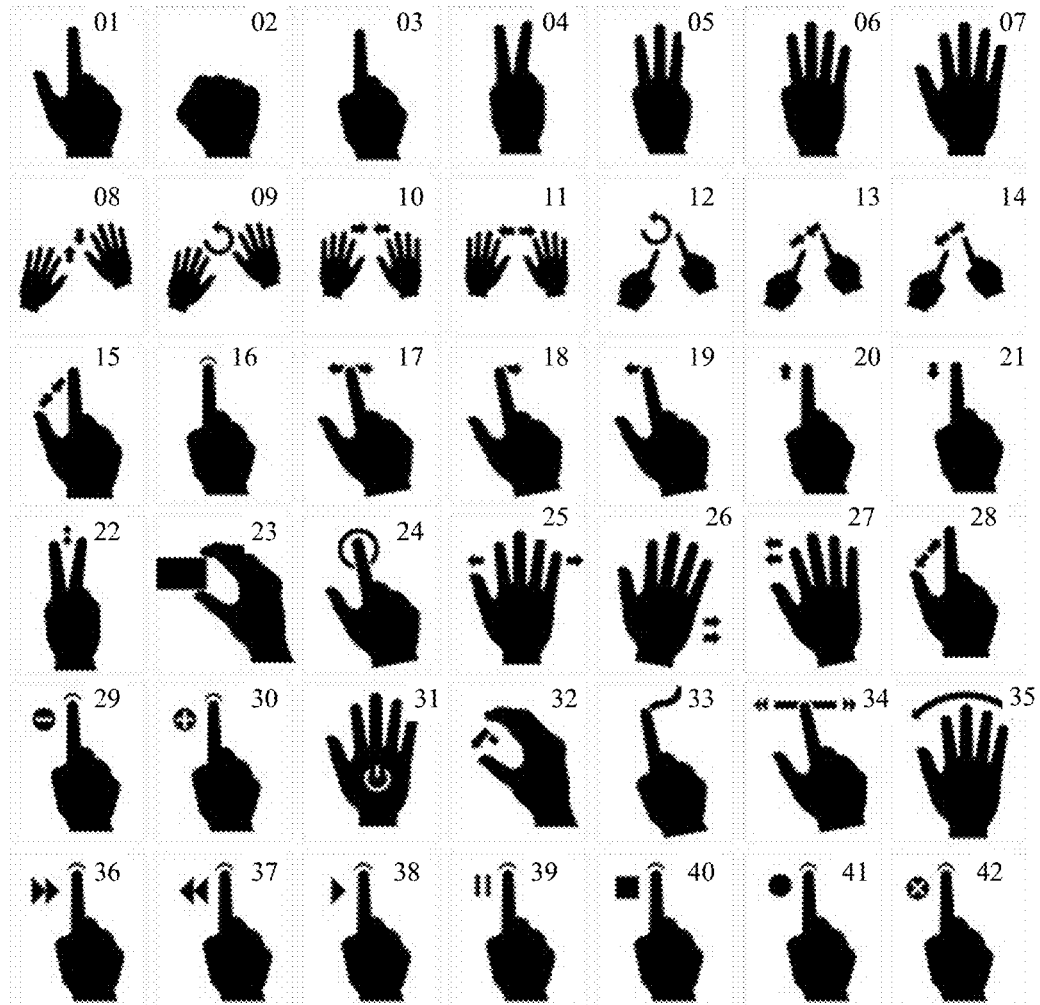
FIG. 3 is a schematic diagram of a set of mapping relationships between gesture images and gesture instructions according to an embodiment of this application.

Embodiments of this application provide a gesture control method for a wearable system and a wearable system. When a location of the wearable system changes, the wearable system can ensure that a gesture working region always remains in a region of interest of the wearable system. Therefore, the wearable system can still collect and recognize a gesture image and implement gesture control.

To make a person skilled in the art better understand the technical solutions in the embodiments of this application, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of the embodiments of this application.

In the specification, claims, and accompanying drawings of the embodiments of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

With popularity of wearable systems, gesture control methods have been gradually applied to various devices. According to a gesture control method for a wearable system, a gesture image may be determined by using a camera to collect infrared light reflected by an auxiliary device or by using a camera to perform stereoscopic imaging on a gesture under natural light, so as to implement gesture control. However, the wearable system is provided with a camera that is fixed relative to the wearable system. As a result, a shooting area of the camera is fixed. In addition, a field of view of the wearable system is fixed. When a location of the wearable system changes, the field of view of the wearable system also changes. Consequently, a gesture working region is beyond the field of view, and the wearable system cannot collect or recognize a gesture image for gesture control.

Referring to FIG. 1, to resolve a problem that when a location of a wearable system changes, the wearable system cannot collect or recognize a gesture image, an embodiment of this application provides the following technical solution: The wearable system includes a first camera, a sensor, a processor, and a bus. The processor creates a gesture working region and a region of interest, where the region of interest is included in a shooting area of the first camera. The sensor obtains a current location parameter of the wearable system. The processor adjusts the region of interest according to the location parameter obtained by the sensor, to ensure that the region of interest covers the gesture working region. The first camera collects a gesture image within the gesture working region. The processor recognizes the gesture image collected by the first camera, to obtain a gesture instruction, and performs a corresponding operation according to the gesture instruction.

In this embodiment of this application, the first camera, the sensor, and the processor may be integrated to form the wearable system, that is, all the components are provided in one device; or may be distributed to form the wearable system, that is, not all components are provided in one device. A composition manner of the wearable system is not limited herein.

For details, refer to FIG. 2.

201. A processor creates a gesture working region and a region of interest.

The processor may create the gesture working region and the region of interest according to user experience. For example, if during usage, a user tends to make a gesture at half a meter in the due front of a device, and a gesture movement area does not exceed 0.5 square meters, the processor may set a 0.5-square-meter area at half a meter in the due front of the device as the gesture working region. The region of interest may be the entire part or a part of a field of view of the camera of the wearable system. For example, if the field of view of the camera is 60 degrees, a field of view of the region of interest may be 60 degrees or 30 degrees.

In this embodiment of this application, the processor may be a specific processor integrated in the wearable system, or another terminal device, for example, a mobile phone or a tablet computer. A form of the processor is not limited herein.

202. The sensor obtains a location parameter of the wearable system.

The wearable system may obtain a current location parameter of the wearable system by using various sensors. The sensor herein includes but is not limited to a gravity sensor, an acceleration transducer, and the like. The location parameter herein includes but is not limited to parameters such as a direction and an angle.

203. The processor adjusts the region of interest according to the location parameter.

The processor obtains, according to the location parameter, a deviation angle of the wearable system relative to the gesture working region; calculates an adjustment angle of the camera of the wearable system according to a relation; and adjusts, according to the adjustment angle, a reflex mirror. to adjust a shooting area of the camera and then adjust the region of interest, or adjusts, according to the adjustment angle, a shooting area of the camera by using a rotary motor, to adjust the region of interest, so that the region of interest can cover the gesture working region.

Optionally, the relation may be determined by a first coordinate system of the gesture area, a second coordinate system of the region of interest, and a third coordinate system of the wearable system. The relation may vary with a method used by the wearable system to create the first coordinate system, the second coordinate system, and the third coordinate system. The wearable system may create a Cartesian coordinate system, an Euler angle coordinate system, or another coordinate system. A specific method for creating the coordinate system is not limited herein. In this embodiment of this application, the Cartesian coordinate system is used as an example.

A first relation includes:

$$\frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta} - \frac{X_{c(i-2)}\sin\alpha_{i-1}\sin\beta_{i-1} + Y_{c(i-2)}\cos\alpha_{i-1} + Z_{c(i-2)}\sin\alpha_{i-1}\cos\beta_{i-1}}{X_{c(i-2)}\cos\beta_{i-1} - Z_{c(i-2)}\sin\beta_{i-1}} = \pm\gamma;$$

-continued $$\frac{a_{21}X_w + a_{22}Y_w + a_{23}Z_w + \Delta Y_{ew}}{a_{11}X_w + a_{12}Y_w + a_{13}Z_w + \Delta X_{ew}} = \frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta}; \text{ or}$$

$$a_{31}X_w + a_{32}Y_w + a_{33}Z_w + \Delta Z_{ew} = C,$$

where $\gamma$ is a critical value of a to-be-adjusted region of interest, C is determined by using a proportion according to a size of the gesture image, and $\alpha$ and $\beta$ are the first adjustment angles of the first camera, where $\alpha$ is an angle of rotation about an x axis, and $\beta$ is an angle of rotation about a y axis; the first coordinate system is $O_w$-$X_w Y_w Z_w$, the second coordinate system is $O_c$-$X_c Y_c Z_c$, and the third coordinate system is $O_w$-$X_w Y_w Z_w$, where $(X_w, Y_w, Z_w)$ is a coordinate value of a point in the first coordinate system, $(X_e, Y_e, Z_e)$ is a coordinate value of a point of $(X_w, Y_w, Z_w)$ in the third coordinate system, $(X_{c(i-1)}, Y_{c(i-1)}, Z_{c(i-1)})$ is a coordinate value of a current imaging center point in the third coordinate system after the second coordinate system is rotated, and $(X_{c(i-2)}, Y_{c(i-2)}, Z_{c(i-2)})$ is a coordinate value of the current imaging center point in the third coordinate system before the second coordinate system is rotated; and $(\Delta X_{ew}, \Delta Y_{ew}, \Delta Z_{ew})$ are translational displacements along an x direction, a y direction, and a z direction when the first coordinate system switches to the third coordinate system, and $(a_{11}, a_{12}, a_{13}, a_{21}, a_{22}, a_{23}, a_{31}, a_{32}, a_{33})$ are determined by using the following formula:

$$R(\varepsilon_z)R(\varepsilon_y)R(\varepsilon_x) = \begin{bmatrix} \cos\varepsilon_y\cos\varepsilon_z & \cos\varepsilon_x\sin\varepsilon_z + \sin\varepsilon_x\sin\varepsilon_y\cos\varepsilon_z & \sin\varepsilon_x\sin\varepsilon_z - \cos\varepsilon_x\cos\varepsilon_y\cos\varepsilon_z \\ -\cos\varepsilon_y\sin\varepsilon_z & \cos\varepsilon_x\cos\varepsilon_z - \sin\varepsilon_x\sin\varepsilon_y\sin\varepsilon_z & \sin\varepsilon_x\cos\varepsilon_z + \cos\varepsilon_x\sin\varepsilon_y\sin\varepsilon_z \\ \sin\varepsilon_y & -\sin\varepsilon_x\cos\varepsilon_y & \cos\varepsilon_x\cos\varepsilon_y \end{bmatrix},$$

simplified as $R(\varepsilon_z)R(\varepsilon_y)R(\varepsilon_x) = \begin{bmatrix} a_{11} & a_{12} & a_{13} \\ a_{21} & a_{22} & a_{23} \\ a_{31} & a_{32} & a_{33} \end{bmatrix}$, where $(\varepsilon_x, \varepsilon_y, \varepsilon_z)$ are angles of rotation in the x direction, the y direction, and the z direction when the first coordinate system switches to the third coordinate system.

For example, if when the wearable system tilts upward relative to a horizontal line, the processor obtains, according to the current location parameter, only one current deviation angle: a 15-degree deviation from the horizontal line, the processor may determine that the adjustment angle is to degrees according to the relation, and accordingly adjusts the reflex mirror according to the to degrees, or accordingly adjusts, by directly using the rotary motor, a lens of the camera according to the to degrees.

For example, if when the wearable system tilts left relative to a vertical line, the processor obtains, according to the current location parameter, only one current deviation angle: a 15-degree deviation from the vertical line, the processor may determine that the adjustment angle is 15 degrees according to the relation, and accordingly adjusts the reflex mirror according to the 15 degrees, or accordingly adjusts, by directly using the rotary motor, a lens of the camera according to the 15 degrees.

For example, if when the wearable system tilts obliquely upward, the processor obtains, according to the current location parameter, two current deviation angles: a 10-degree deviation from a horizontal line and a 15-degree deviation from a vertical line, the processor may determine that the adjustment angles are 8 degrees and 15 degrees according to the relation, and accordingly adjusts the reflex mirror according to the 8 degrees and the 15 degrees, or accordingly adjusts, by directly using the rotary motor, a lens of the camera according to the 8 degrees and the 15 degrees.

204. The wearable system collects a gesture image from the gesture working region.

The wearable system creates a gesture template, collects a user gesture from the gesture working region, and uses the gesture template to generate the gesture image according to the collected gesture. The gesture image includes a static hand posture or a moving hand motion.

Optionally, the wearable system may also use the following method during the process of collecting the gesture image from the gesture working region.

The wearable system may transmit, by using an infrared light transmitter of the wearable system, infrared light to cover the gesture working region. This can enhance a gesture image signal of a user.

The wearable system may use an infrared cut-off filter to filter out stray light, so as to obtain infrared light reflected from the gesture working region. This can reduce stray light incidence and reduce a color processing complexity of the gesture image for the wearable system.

In addition, in this embodiment of this application, the wearable system uses two cameras with binocular vision to collect the gesture image. That is, the wearable system may also include a second camera. Herein, after receiving the infrared light reflected from the gesture working region, the first camera generates a first gesture image, and after receiving the infrared light reflected from the gesture working region, the second camera generates a second gesture image. The wearable system performs, by using a calculation method such as coordinate transformation, stereo rectification, and stereo matching calculation, calculation on the first gesture image and the second gesture image to obtain the gesture image. In this way, the gesture image includes image parallax and image depth information, so that the wearable system can recognize the gesture image more precisely.

Optionally, the wearable system may further track and recognize a gesture more precisely. The specific method is as follows:

A laser is provided in the camera of the wearable system, and laser light transmitted by the laser may form a light spot in the gesture image. When there is no light spot in the gesture image collected by the wearable system, the wearable system determines that its region of interest does not completely cover the gesture region, that is, the collected gesture image is unclear. In this case, the wearable system may adjust the region of interest, so as to ensure that there is a light spot in a new gesture image collected by the wearable system.

Optionally, the method used by the wearable system to create a gesture template may be creating, by using a kinetic parameter and two dimensional projection of the wearable system, a three dimensional gesture model, for example, a complex dynamic gesture model based on a hidden Markov model-fuzzy neural network (hidden markov model-fuzzy neural network, HMM-FNN for short) model. A gesture eigenvalue V may be expressed by using the following formula:

$$V = \alpha \left[ V_{base} + 100 \times \sum_{i=0}^{4} (Len(i)/D_h) + 100 \times \sum_{j=0}^{n} (Dis(j)/D_h) \right] + (100 - \alpha)E$$

where $\alpha$ (0-100) is a proportional number, n is a quantity of fingers visible in the gesture image, and E is a relative eccentricity of the current gesture area and may be calculated according to the following formula:

$$E = \sqrt{\frac{(A+B) - \sqrt{(A-B)^2 + 4H^2}}{(A+B) + \sqrt{(A-B)^2 + 4H^2}}},$$

$$A = \Sigma m_i(y_i^2 + z_i^2), B = \Sigma m_i(z_i^2 + x_i^2), H = \Sigma m_i x_i y_i$$

In the formula, A and B are moment of inertia of a rigid body rotating about an x axis and a y axis respectively, and H is a product of inertia. In actual application, a method for creating a gesture template is not limited to the foregoing method, and multiple methods may be used.

205. The wearable system recognizes the gesture image to obtain a gesture instruction.

The wearable system creates a mapping relationship set between a gesture image and a gesture instruction, and the wearable system converts the gesture image into a corresponding gesture instruction according to the mapping relationship set.

For example, the mapping relationship set created by the wearable system may be shown in FIG. 3. A reference numeral 02 may indicate disabling a current application program, a reference numeral 03 may indicate playing the first song in a song list, a reference numeral 04 may indicate playing the second song in the song list, a reference numeral to may indicate zooming out a current picture, and a reference numeral 11 may indicate zooming in a current picture. Detailed mapping relationships may be set by the user, and no limitation is set herein.

206. The wearable system performs a corresponding operation according to the gesture instruction.

The wearable system performs the corresponding operation according to the obtained gesture instruction. For example, if the gesture instruction obtained by the wearable system according to the gesture image is playing music, the wearable system enables a music player to play music.

In the solution provided in this application, after creating the gesture working region and the region of interest, the wearable system obtains the location parameter of the wearable system, and adjusts the region of interest of the wearable system according to the location parameter, so that the region of interest can cover the gesture working region. The region of interest is within the field of view of the camera of the wearable system. When the location of the wearable system changes, the wearable system can ensure that the gesture working region always remains in the field of view of the wearable system. Therefore, the wearable system can still collect and recognize a gesture image and implement gesture control. In addition, the wearable system uses the infrared light transmitter of the wearable system to transmit infrared light to cover the gesture working region, so that a gesture signal can be enhanced. The wearable system uses the infrared cut-off filter to filter out stray light other than infrared light, so that image color processing is simplified. The wearable system uses dual cameras to collect a gesture image in a binocular vision manner, so that the obtained gesture image can contain image depth information, thereby improving gesture image recognition precision. When there is no light spot, formed from the laser light transmitted by the laser, in the gesture image, the wearable system adjusts the region of interest, to enable the first camera to perform precise gesture tracking and alignment, further improving a tracking capability and recognition precision. The foregoing describes the gesture control method for a wearable system in this embodiment of this application. The following describes the wearable system in the embodiments of this application according to different composition manners of the wearable system.

1. The wearable system is formed in an integrated manner. Head mounted spectacles are used as an example. For details, refer to FIG. 4.

The wearable system 4400 includes a spectacle frame 401, a spectacle lens 402, a first camera 403, an infrared light emitting diode LED 404, a sensor 405, a display device 406, a processor 407, and a bus 408.

The first camera 403, the sensor 405, the display device 406, and the processor 407 are connected by using the bus 408.

Figure 4:
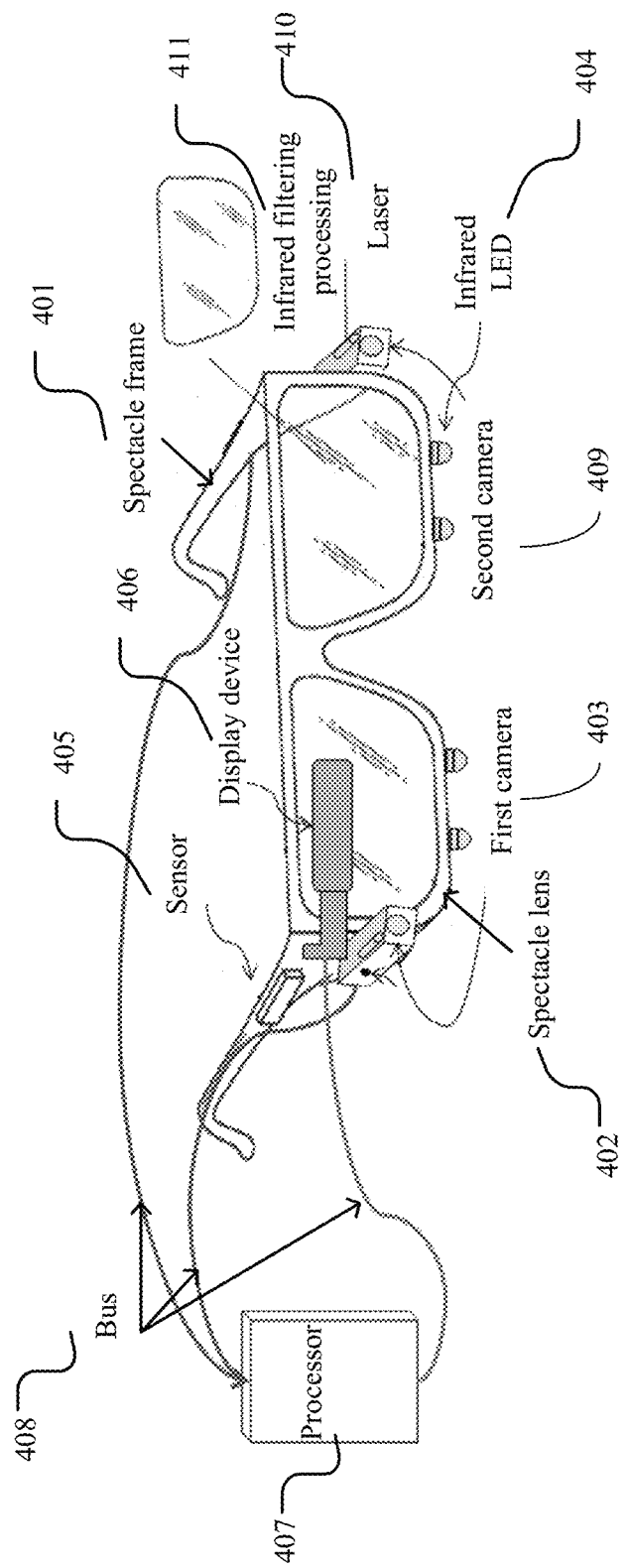
FIG. 4 is a schematic diagram of a wearable system according to an embodiment of this application.

The bus 408 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, the bus in FIG. 4 is represented by using only one bold line, but it does not indicate that there is only one bus or only one type of bus.

The first camera 403 is provided with a laser 410 and an infrared cut-off filter 411. The wearable system further includes a second camera 409, and the second camera 409 is also provided with a laser 410 and an infrared cut-off filter 411. The first camera 403 and the second camera 409 are located on two horizontal sides of the spectacle frame 401, respectively. The first camera 403 and the second camera 409 further include a reflex mirror and/or a rotary motor. The reflex mirror is configured to reflect an image in the region of interest into shooting areas of the first camera and the second camera. The rotary motor is configured to adjust shooting angles of the first camera and the second camera.

The infrared LED 404 is included in the wearable system 400.

The sensor 405 is included in the wearable system 400.

The display device 406 is included in the wearable system 400. The processor 407 is included in the wearable system 400.

The processor 407 is configured to: create a gesture working region, and create a region of interest according to the gesture working region. The region of interest is included in the shooting area of the first camera 403, and the first camera 403 is included in the wearable system.

The sensor 405 is configured to obtain a location parameter of the wearable system.

The processor 407 is configured to adjust the region of interest according to the location parameter obtained by the sensor 405, so that the region of interest covers the gesture working region.

The camera 403 is configured to collect a gesture image within the gesture working region. The gesture image includes a static hand posture and/or a dynamic gesture motion.

The processor 407 is configured to: recognize the gesture image collected by the first camera 403 to obtain a gesture instruction, and perform a corresponding operation according to the gesture instruction.

Other specific functions of the processor 407 are the same as those described in the method shown in FIG. 2, and details are not described again herein.

Optionally, the infrared LED 404 is configured to transmit infrared light to cover the gesture working region created by the processor.

The infrared cut-off filter 411 is configured to perform filtering to obtain infrared light reflected from the gesture working region created by the processor.

The first camera 403 and the second camera 409 are configured to receive the reflected infrared light obtained by the infrared cut-off filter 411.

The processor 407 is configured to: generate a first gesture image according to the reflected infrared light received by the first camera 403, and generate a second gesture image according to the reflected infrared light received by the second camera 409; and perform calculation on the first gesture image and the second gesture image to obtain the gesture image.

Optionally, the processor 407 is configured to: when determining that there is no light spot in the gesture image, re-adjust the shooting angle of the camera, and then adjust the region of interest, so that there is a light spot in a newly collected gesture image. The light spot is generated from laser light transmitted by the laser 410.

In the solution provided in this application, after the processor 407 creates the gesture working region and the region of interest, the sensor 405 obtains its own location parameter, and the processor 407 adjusts the region of interest of the wearable system according to the location parameter, so that the region of interest can cover the gesture working region. The region of interest is within the field of view of the first camera 403. When the location of the wearable system changes, the wearable system can ensure that the gesture working region always remains in the field of view of the wearable system. Therefore, the wearable system can still collect and recognize a gesture image and implement gesture control. In addition, the wearable system uses the infrared light emitting diode LED 404 to transmit infrared light to cover the gesture working region, so that a gesture signal can be enhanced. The wearable system uses the infrared cut-off filter 411 to filter out stray light other than infrared light, so that image color processing is simplified. The wearable system uses dual cameras, that is, the first camera 403 and the second camera 409, to collect a gesture image in a binocular vision manner, so that the obtained gesture image can contain image depth information, thereby improving gesture image recognition precision. When there is no light spot, formed from laser light transmitted by the laser 410, in the gesture image, the wearable system adjusts the region of interest, so as to enable the first camera 403 and the second camera 409 to perform precise gesture tracking and alignment, further improving a tracking capability and recognition precision.

Figure 5:
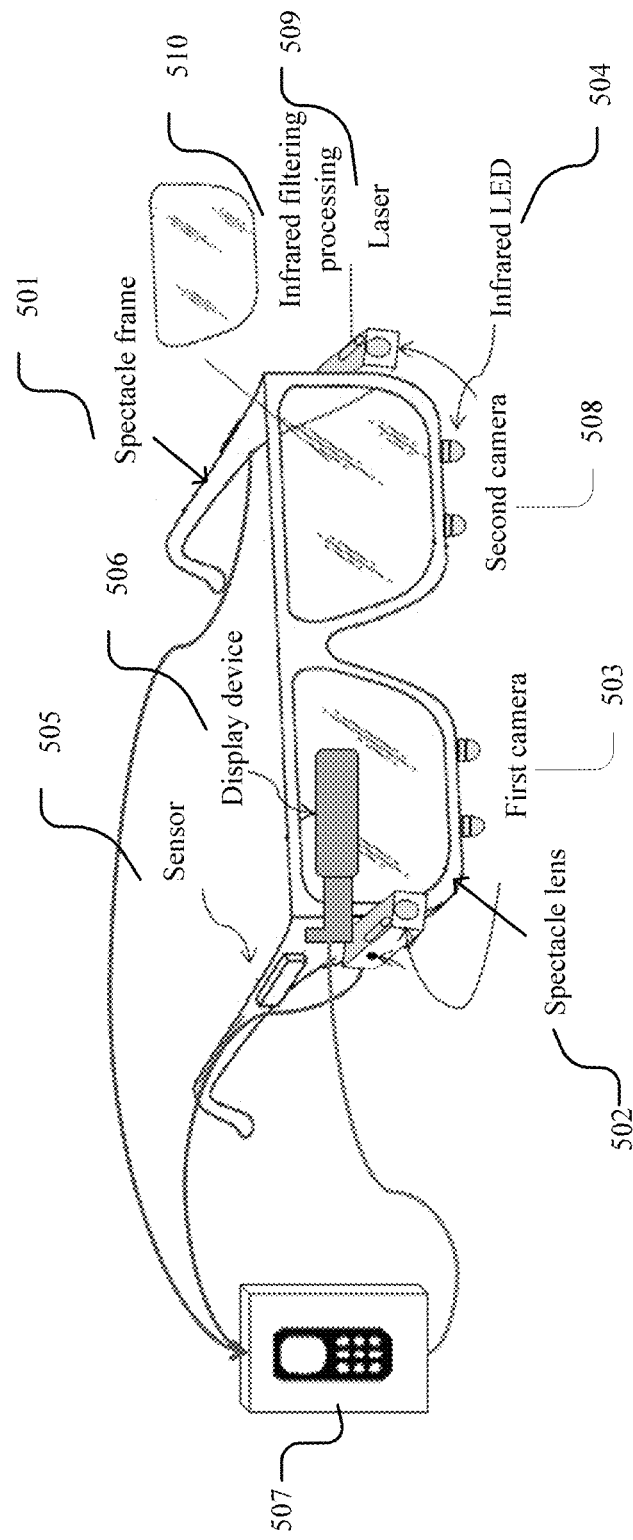
FIG. 5 is another schematic diagram of a wearable system according to an embodiment of this application.

2. The wearable system is formed in a distributed manner. Head mounted spectacles are used as an example. For details, refer to FIG. 5.

The wearable system 500 includes a spectacle frame 501, a spectacle lens 502, a first camera 503, an infrared light emitting diode LED 504, a sensor 505, a display device 506, and a processor 507.

The processor 507 of the wearable system is another device terminal, for example, a mobile phone and a tablet computer. In addition, the processor 507 may be connected to the first camera 503, the sensor 505, and the display device 506 of the wearable system in a wireless connection manner such as Bluetooth.

The first camera 503 is provided with a laser 509 and an infrared cut-off filter 510. The wearable system further includes a second camera 509, and the second camera 508 is also provided with a laser 509 and an infrared cut-off filter 510. The first camera 503 and the second camera 508 are located on two horizontal sides of the spectacle frame 501, respectively. The first camera 503 and the second camera 508 further include a reflex mirror and/or a rotary motor. The reflex mirror is configured to reflect an image in the region of interest into shooting areas of the first camera and the second camera. The rotary motor is configured to adjust shooting angles of the first camera and the second camera.

The infrared LED 504 is included in the wearable system 500.

The sensor 505 is included in the wearable system 500.

The display device 506 is included in the wearable system 500. The processor 507 is included in the wearable system 500.

The processor 507 is configured to: create a gesture working region, and create a region of interest according to the gesture working region. The region of interest is included in the shooting area of the first camera 503, and the first camera 503 is included in the wearable system.

The sensor 505 is configured to obtain a location parameter of the wearable system.

The processor 507 is configured to adjust the region of interest according to the location parameter obtained by the sensor 505, so that the region of interest covers the gesture working region.

The camera 503 is configured to collect a gesture image within the gesture working region. The gesture image includes a static hand posture and/or a dynamic gesture motion.

The processor 507 is configured to: recognize the gesture image collected by the first camera 503 to obtain a gesture instruction, and perform a corresponding operation according to the gesture instruction.

Other specific functions of the processor 507 are the same as those described in the method shown in FIG. 2, and details are not described again herein.

Optionally, the infrared LED 504 is configured to transmit infrared light to cover the gesture working region created by the processor.

The infrared cut-off filter 510 is configured to perform filtering to obtain infrared light reflected from the gesture working region created by the processor.

The first camera 503 and the second camera 508 are configured to receive the reflected infrared light obtained by the infrared cut-off filter 510.

The processor 507 is configured to: generate a first gesture image according to the reflected infrared light received by the first camera 503, and generate a second gesture image according to the reflected infrared light received by the second camera 508; and perform calculation on the first gesture image and the second gesture image to obtain the gesture image.

Optionally, the processor 507 is configured to: when determining that there is no light spot in the gesture image, re-adjust the shooting angle of the camera, and then adjust the region of interest, so that there is a light spot in a newly collected gesture image. The light spot is generated from laser light transmitted by the laser 509. In the solution provided in this application, after the processor 507 creates the gesture working region and the region of interest, the sensor 505 obtains its own location parameter, and the processor 507 adjusts the region of interest of the wearable system according to the location parameter, so that the region of interest can cover the gesture working region. The region of interest is within the field of view of the first camera 503. When the location of the wearable system changes, the wearable system can ensure that the gesture working region always remains in the field of view of the wearable system. Therefore, the wearable system can still collect and recognize a gesture image and implement gesture control. In addition, the wearable system uses the infrared light emitting diode LED 504 to transmit infrared light to cover the gesture working region, so that a gesture signal can be enhanced. The wearable system uses the infrared cut-off filter 510 to filter out stray light other than infrared light, so that image color processing is simplified. The wearable system uses dual cameras, that is, the first camera 503 and the second camera 508, to collect a gesture image in a binocular vision manner, so that the obtained gesture image can contain image depth information, thereby improving gesture image recognition precision. When there is no light spot, formed from laser light transmitted by the laser 509, in the gesture image, the wearable system adjusts the region of interest, to enable the first camera 503 and the second camera 508 to perform precise gesture tracking and alignment, further improving a tracking capability and recognition precision. In addition, the processor 507 is replaced with the another terminal device, and costs of the wearable system can be reduced.

The wearable system provided in this embodiment of the present invention is not limited to spectacles, and may be a smart watch, a smart band, a helmet, or the like, or may be formed in a distributed form as described above.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A gesture control method for a wearable system, the method comprising:
    creating, by a wearable system, a gesture working region and a region of interest, wherein the region of interest is within a shooting area of a first camera, and the first camera is comprised in the wearable system;
    obtaining, by the wearable system, a location parameter of the wearable system;
    adjusting, by the wearable system, the region of interest according to the location parameter, so that the region of interest overlaps with the gesture working region, wherein adjusting the region of interest comprises:
        calculating, by the wearable system, a first adjustment angle of the first camera by using a first relation, wherein the first relation is determined by the wearable system according to a first coordinate system, a second coordinate system, and a third coordinate system, the first coordinate system is created by the wearable system according to the gesture working region, the second coordinate system is created by the wearable system according to the region of interest, and the third coordinate system is created by the wearable system according to the wearable system itself, and
        adjusting, by the wearable system according to the first adjustment angle, the first camera so as to adjust the region of interest;
    collecting, by the wearable system, a gesture image within the gesture working region, wherein the gesture image comprises a static hand posture and/or a dynamic gesture motion;
    recognizing, by the wearable system, the gesture image to obtain a gesture instruction; and
    performing, by the wearable system, an operation according to the gesture instruction.

2. The gesture control method for a wearable system according to claim 1, wherein adjusting the region of interest comprises:
    obtaining, by the wearable system, a deviation angle of the wearable system according to the location parameter;
    calculating, by the wearable system according to the deviation angle, the first adjustment angle of the first camera by using a first relation; and
    adjusting, by the wearable system according to the first adjustment angle, an angle of a reflex mirror, and/or a shooting angle of the first camera by using a rotary motor, so as to adjust the region of interest, wherein the reflex mirror is configured to reflect an image in the region of interest into the shooting area of the first camera.

3. The gesture control method for a wearable system according to claim 2, wherein collecting the gesture image comprises:
    transmitting, by the wearable system by using an infrared light transmitter of the wearable system, infrared light to cover the gesture working region;
    performing, by the wearable system by using an infrared cut-off filter, filtering to obtain infrared light reflected from the gesture working region, and receiving the reflected infrared light by using the first camera and a second camera, wherein the second camera is comprised in the wearable system;
    generating, by the wearable system, a first gesture image by using the first camera, and generating a second gesture image by using the second camera; and
    performing, by the wearable system, calculation on the first gesture image and the second gesture image to obtain the gesture image.

4. The gesture control method for a wearable system according to claim 2, wherein the first relation comprises:

$$\frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta} - \frac{X_{c(i-2)}\sin\alpha_{i-1}\sin\beta_{i-1} + Y_{c(i-2)}\cos\alpha_{i-1} + Z_{c(i-2)}\sin\alpha_{i-1}\cos\beta_{i-1}}{X_{c(i-2)}\cos\beta_{i-1} - Z_{c(i-2)}\sin\beta_{i-1}} = \pm\gamma;$$

$$\frac{a_{21}X_w + a_{22}Y_w + a_{23}Z_w + \Delta Y_{ew}}{a_{11}X_w + a_{12}Y_w + a_{13}Z_w + \Delta X_{ew}} = \frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta}; \text{ or}$$

$$a_{31}X_w + a_{32}Y_w + a_{33}Z_w + \Delta Z_{ew} = C,$$

wherein γ is a critical value of a to-be-adjusted region of interest, C is determined by using a proportion according to a size of the gesture image, and α and β are the first adjustment angles of the first camera, wherein α is an angle of rotation about an x axis, and β is an angle of rotation about a y axis; the first coordinate system is $O_w$-$X_wY_wZ_w$, the second coordinate system is $O_c$-$X_cY_cZ_c$, and the third coordinate system is $O_e$-$X_eY_eZ_e$, wherein ($X_w$, $Y_w$, $Z_w$) is a coordinate value of a point in the first coordinate system, ($X_e$, $Y_e$, $Z_e$) is a coordinate value of ($X_w$, $Y_w$, $Z_w$) in the third coordinate system, ($X_{c(i-1)}$, $Y_{c(i-1)}$, $Z_{c(i-1)}$) is a coordinate value of a current imaging center point in the third coordinate system after the second coordinate system is rotated, and ($X_{c(i-2)}$, $Y_{c(i-2)}$, $Z_{c(i-2)}$) is a coordinate value of the current imaging center point in the third coordinate system before the second coordinate system is rotated; and ($\Delta X_{ew}$, $\Delta Y_{ew}$, $\Delta Z_{ew}$) are translational displacements along an x direction, a y direction, and a z direction when the first coordinate system switches to the third coordinate system, and ($a_{11}$, $a_{12}$, $a_{13}$, $a_{21}$, $a_{22}$, $a_{23}$, $a_{31}$, $a_{32}$, $a_{33}$) are determined by using the following formula:

$$R(\varepsilon_z)R(\varepsilon_y)R(\varepsilon_x) = \begin{bmatrix} \cos\varepsilon_y\cos\varepsilon_z & \cos\varepsilon_x\sin\varepsilon_z + \sin\varepsilon_x\sin\varepsilon_y\cos\varepsilon_z & \sin\varepsilon_x\sin\varepsilon_z - \cos\varepsilon_x\cos\varepsilon_y\cos\varepsilon_z \\ -\cos\varepsilon_y\sin\varepsilon_z & \cos\varepsilon_x\cos\varepsilon_z - \sin\varepsilon_x\sin\varepsilon_y\sin\varepsilon_z & \sin\varepsilon_x\cos\varepsilon_z + \cos\varepsilon_x\sin\varepsilon_y\sin\varepsilon_z \\ \sin\varepsilon_y & -\sin\varepsilon_x\cos\varepsilon_y & \cos\varepsilon_x\cos\varepsilon_y \end{bmatrix},$$

-continued $$\text{simplified as } R(\varepsilon_z)R(\varepsilon_y)R(\varepsilon_x) = \begin{bmatrix} a_{11} & a_{12} & a_{13} \\ a_{21} & a_{22} & a_{23} \\ a_{31} & a_{32} & a_{33} \end{bmatrix},$$

wherein ($\varepsilon_x$, $\varepsilon_y$, $\varepsilon_z$) are angles of rotation in the x direction, the y direction, and the z direction when the first coordinate system switches to the third coordinate system.

5. The gesture control method for a wearable system according to claim 4, wherein collecting the gesture image comprises:
transmitting, by the wearable system by using an infrared light transmitter of the wearable system, infrared light to cover the gesture working region;
performing, by the wearable system by using an infrared cut-off filter, filtering to obtain infrared light reflected from the gesture working region, and receiving the reflected infrared light by using the first camera and a second camera, wherein the second camera is comprised in the wearable system;
generating, by the wearable system, a first gesture image by using the first camera, and generating a second gesture image by using the second camera; and
performing, by the wearable system, a calculation on the first gesture image and the second gesture image to obtain the gesture image.

6. The gesture control method for a wearable system according to claim 1, wherein collecting the gesture image comprises:
transmitting, by the wearable system by using an infrared light transmitter of the wearable system, infrared light to cover the gesture working region;
performing, by the wearable system by using an infrared cut-off filter, filtering to obtain infrared light reflected from the gesture working region, and receiving the reflected infrared light by using the first camera and a second camera, wherein the second camera is comprised in the wearable system;
generating, by the wearable system, a first gesture image by using the first camera, and generating a second gesture image by using the second camera; and
performing, by the wearable system, a calculation on the first gesture image and the second gesture image to obtain the gesture image.

7. The gesture control method for a wearable system according claim 1, wherein after the collecting the gesture image, and before recognizing the gesture image, the method further comprises:
re-adjusting, by the wearable system, the region of interest when the wearable system determines that there is no light spot in the gesture image, so that there is a light spot in a new gesture image collected by the wearable system, wherein the light spot is generated from laser light transmitted by a laser provided in the first camera of the wearable system.

8. A gesture control method for a wearable system, the method comprising:
creating, by a wearable system, a gesture working region and a region of interest, wherein the region of interest is within a shooting area of a first camera, and the first camera is comprised in the wearable system;
obtaining, by the wearable system, a location parameter of the wearable system;
adjusting, by the wearable system, the region of interest according to the location parameter, so that the region of interest overlaps with the gesture working region, wherein adjusting the region of interest comprises:
obtaining, by the wearable system by using the location parameter, a tilting angle when the wearable system tilts upward or downward, wherein the tilting angle is used to indicate an upward deviation angle or a downward deviation angle of the wearable system;
calculating, by the wearable system according to the tilting angle, a second adjustment angle of the first camera by using a second relation, wherein the second relation is determined by the wearable system according to a first coordinate system, a second coordinate system, and a third coordinate system; and
adjusting, by the wearable system according to the second adjustment angle, the first camera so as to adjust the region of interest.

9. The gesture control method for a wearable system according to claim 8, wherein collecting the gesture image comprises:
transmitting, by the wearable system by using an infrared light transmitter of the wearable system, infrared light to cover the gesture working region;
performing, by the wearable system by using an infrared cut-off filter, filtering to obtain infrared light reflected from the gesture working region, and receiving the reflected infrared light by using the first camera and a second camera, wherein the second camera is comprised in the wearable system;
generating, by the wearable system, a first gesture image by using the first camera, and generating a second gesture image by using the second camera; and
performing, by the wearable system, a calculation on the first gesture image and the second gesture image to obtain the gesture image.

10. The method of claim 8, wherein adjusting the region of interest comprises:
adjusting, by the wearable system according to the second adjustment angle, an angle of a reflex mirror, and/or a shooting angle of the first camera by using a rotary motor, so as to adjust the region of interest, wherein the reflex mirror is configured to reflect an image in a field of view of the wearable system into the shooting area of the first camera; and
the second relation is:

$$\phi = \sin^{-1}\{[X_{world} - d_x - \cos(\varphi - \theta)X_{camera} - \sin(\varphi - \theta)Z_{camera}]/1)\} - \varphi \text{ or}$$

$$\phi = \cos^{-1}\{[Z_{world} - d_z + \sin(\varphi - \theta)X_{camera} - \cos(\varphi - \theta)Z_{camera}]/1)\} - \varphi,$$

wherein ($X_{world}$, $Y_{world}$, $Z_{world}$) are coordinates of the gesture working region, ($X_{current}$, $Y_{current}$, $Z_{current}$) are coordinates of the region of interest, $\varphi$ is the tilting angle, $\phi$ is the second adjustment angle, $\theta$ is a viewing angle of the region of interest, 1 is a length of the camera, $d_x$ is a vertical distance between the camera and the gesture working region, and $d_z$ is a horizontal distance between the camera and the gesture working region.

11. A wearable system comprising:
a first camera, a sensor, a processor, and a bus, wherein the first camera and the sensor are coupled to the processor through the bus;
a memory storing a program to be executed in the processor, the program comprising instructions to create a gesture working region and a region of interest, wherein the region of interest is within a shooting area of the first camera;

wherein the sensor is configured to obtain a location parameter of the wearable system and provide to the processor;

wherein the instructions cause the processor to calculate, based on the location parameter, a first adjustment angle by using a first relation, wherein the first relation is determined by the wearable system according to a first coordinate system, a second coordinate system, and a third coordinate system, the first coordinate system is created by the wearable system according to the gesture working region, the second coordinate system is created by the wearable system according to the region of interest, and the third coordinate system is created by the wearable system according to the wearable system itself, adjust the region of interest according to the location parameter by adjusting the camera according to the first adjustment angle, so that the region of interest overlaps with the gesture working region;

wherein the first camera collects a gesture image within the gesture working region, wherein the gesture image comprises a static hand posture and/or a dynamic gesture motion; and wherein the instructions cause the processor to recognize the gesture image collected by the first camera, to obtain a gesture instruction, and perform a corresponding operation according to the gesture instruction.

12. The wearable system according to claim 11, wherein the first camera further comprises a reflex mirror and/or a rotary motor, the reflex mirror is configured to reflect an image in the region of interest into the shooting area of the first camera, and the rotary motor is configured to adjust a shooting angle of the first camera; and the instructions further cause the processor to: obtain a deviation angle of the wearable system according to the location parameter obtained by the sensor, and calculate, according to the deviation angle, the first adjustment angle by using a first relation; and adjust, according to the first adjustment angle, an angle of the reflex mirror, and/or the shooting angle of the camera by using the rotary motor, so as to adjust the region of interest.

13. The wearable system according to claim 12, wherein the first relation comprises:

$$\frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta} - \frac{X_{c(i-2)}\sin\alpha_{i-1}\sin\beta_{i-1} + Y_{c(i-2)}\cos\alpha_{i-1} + Z_{c(i-2)}\sin\alpha_{i-1}\cos\beta_{i-1}}{X_{c(i-2)}\cos\beta_{i-1} - Z_{c(i-2)}\sin\beta_{i-1}} = \pm\gamma;$$

$$\frac{a_{21}X_w + a_{22}Y_w + a_{23}Z_w + \Delta Y_{ew}}{a_{11}X_w + a_{12}Y_w + a_{13}Z_w + \Delta X_{ew}} = \frac{X_{c(i-1)}\sin\alpha\sin\beta + Y_{c(i-1)}\cos\alpha + Z_{c(i-1)}\sin\alpha\cos\beta}{X_{c(i-1)}\cos\beta - Z_{c(i-1)}\sin\beta}; \text{ or}$$

$$a_{31}X_w + a_{32}Y_w + a_{33}Z_w + \Delta Z_{ew} = C,$$

wherein $\gamma$ is a critical value of a to-be-adjusted region of interest, C is determined by using a proportion according to a size of the gesture image, and $\alpha$ and $\beta$ are the first adjustment angles of the first camera, wherein $\alpha$ is an angle of rotation about an x axis, and $\beta$ is an angle of rotation about a y axis; the first coordinate system is $O_w$-$X_w Y_w Z_w$, the second coordinate system is $O_c$-$X_c Y_c Z_c$, and the third coordinate system is $O_e$-$X_e Y_e Z_e$, wherein $(X_w, Y_w, Z_w)$ is a coordinate value of a point in the first coordinate system, $(X_e, Y_e, Z_e)$ is a coordinate value of a point of $(X_w, Y_w, Z_w)$ in the third coordinate system, $(X_{c(i-1)}, Y_{c(i-1)}, Z_{c(i-1)})$ is a coordinate value of a current imaging center point in the third coordinate system after the second coordinate system is rotated, and $(X_{c(i-2)}, Y_{c(i-2)}, Z_{c(i-2)})$ is a coordinate value of the current imaging center point in the third coordinate system before the second coordinate system is rotated; and $(\Delta X_{ew}, \Delta Y_{ew}, \Delta Z_{ew})$ are translational displacements along an x direction, a y direction, and a z direction when the first coordinate system switches to the third coordinate system, and $(a_{11}, a_{12}, a_{13}, a_{21}, a_{22}, a_{23}, a_{31}, a_{32}, a_{33})$ are determined by using the following formula:

$$R(\varepsilon_z)R(\varepsilon_y)R(\varepsilon_x) = \begin{bmatrix} \cos\varepsilon_y\cos\varepsilon_z & \cos\varepsilon_x\sin\varepsilon_z + \sin\varepsilon_x\sin\varepsilon_y\cos\varepsilon_z & \sin\varepsilon_x\sin\varepsilon_z - \cos\varepsilon_x\cos\varepsilon_y\cos\varepsilon_z \\ -\cos\varepsilon_y\sin\varepsilon_z & \cos\varepsilon_x\cos\varepsilon_z - \sin\varepsilon_x\sin\varepsilon_y\sin\varepsilon_z & \sin\varepsilon_x\cos\varepsilon_z + \cos\varepsilon_x\sin\varepsilon_y\sin\varepsilon_z \\ \sin\varepsilon_y & -\sin\varepsilon_x\cos\varepsilon_y & \cos\varepsilon_x\cos\varepsilon_y \end{bmatrix},$$

simplified as $R(\varepsilon_z)R(\varepsilon_y)R(\varepsilon_x) = \begin{bmatrix} a_{11} & a_{12} & a_{13} \\ a_{21} & a_{22} & a_{23} \\ a_{31} & a_{32} & a_{33} \end{bmatrix},$ wherein $(\varepsilon_x, \varepsilon_y, \varepsilon_z)$ are angles of rotation in the x direction, the y direction, and the z direction when the first coordinate system switches to the third coordinate system.

14. The wearable system according to claim 13, wherein the wearable system further comprises an infrared light emitting diode (LED) and a display device, and a laser and an infrared cut-off filter are provided in the first camera;

the infrared LED is configured to transmit infrared light to cover the gesture working region created by the processor;

the infrared cut-off filter is configured to perform filtering to obtain infrared light reflected from the gesture working region created by the processor;

the wearable system further comprises a second camera, a laser and an infrared cut-off filter are provided in the second camera, and the second camera and the first camera are configured to receive the reflected infrared light obtained by the infrared cut-off filter; and the instructions cause the processor to: generate a first gesture image according to the reflected infrared light received by the first camera, and generate a second gesture image according to the reflected infrared light received by the second camera; and perform calculation on the first gesture image and the second gesture image to obtain the gesture image.

15. The wearable system according to claim 12, wherein the wearable system further comprises an infrared light emitting diode (LED) and a display device, and a laser and an infrared cut-off filter are provided in the first camera;

the infrared LED is configured to transmit infrared light to cover the gesture working region created by the processor;

the infrared cut-off filter is configured to perform filtering to obtain infrared light reflected from the gesture working region created by the processor;

the wearable system further comprises a second camera, a laser and an infrared cut-off filter are provided in the second camera, and the second camera and the first camera are configured to receive the reflected infrared light obtained by the infrared cut-off filter; and the instructions cause the processor to: generate a first gesture image according to the reflected infrared light received by the first camera, and generate a second gesture image according to the reflected infrared light received by the second camera; and perform calculation on the first gesture image and the second gesture image to obtain the gesture image.

16. The wearable system according to claim 12, wherein the instructions cause the processor to: when determining that there is no light spot in the gesture image, re-adjust the shooting angle of the first camera, and then adjust the region of interest, so that there is a light spot in a newly collected gesture image, wherein the light spot is generated from laser light transmitted by the laser.

17. The wearable system according to claim 11, wherein the instructions cause the processor to: when the wearable system tilts upward or downward, obtain a tilting angle by using the location parameter obtained by the sensor, wherein the tilting angle is used to indicate an upward deviation angle or a downward deviation angle of the wearable system; calculate, according to the tilting angle, a second adjustment angle of the camera by using a second relation, wherein the second relation is determined by the wearable system according to the first coordinate system, the second coordinate system, and the third coordinate system; and adjust, according to the second adjustment angle, an angle of a reflex mirror, and/or a shooting angle of the camera by using a rotary motor, so as to adjust the region of interest, wherein the second relation is:

$$\phi = \sin^{-1}\{[X_{world} - d_x - \cos(\varphi-\theta)X_{camera} - \sin(\varphi-\theta)Z_{camera}]/1)\} - \varphi \text{ or}$$

$$\phi = \cos^{-1}\{[Z_{world} - d_z + \sin(\varphi-\theta)X_{camera} - \cos(\varphi-\theta)Z_{camera}]/1)\} - \varphi,$$

wherein $(X_{world}, Y_{world}, Z_{world})$ are coordinates of the gesture working region, $(X_{current}, Y_{current}, Z_{current})$ are coordinates of the region of interest, $\varphi$ is the tilting angle, $\phi$ is the second adjustment angle, $\theta$ is a viewing angle of the region of interest, 1 is a length of the camera, $d_x$ is a vertical distance between the camera and the gesture working region, and $d_z$ is a horizontal distance between the camera and the gesture working region.

18. The wearable system according to claim 17, wherein the wearable system further comprises an infrared light emitting diode (LED) and a display device, and a laser and an infrared cut-off filter are provided in the first camera;

the infrared LED is configured to transmit infrared light to cover the gesture working region created by the processor;

the infrared cut-off filter is configured to perform filtering to obtain infrared light reflected from the gesture working region created by the processor;

the wearable system further comprises a second camera, a laser and an infrared cut-off filter are provided in the second camera, and the second camera and the first camera are configured to receive the reflected infrared light obtained by the infrared cut-off filter; and the instructions cause the processor to: generate a first gesture image according to the reflected infrared light received by the first camera, and generate a second gesture image according to the reflected infrared light received by the second camera; and perform calculation on the first gesture image and the second gesture image to obtain the gesture image.

19. The wearable system according to claim 17, wherein the instructions cause the processor to: when determining that there is no light spot in the gesture image, re-adjust the shooting angle of the first camera, and then adjust the region of interest, so that there is a light spot in a newly collected gesture image, wherein the light spot is generated from laser light transmitted by a laser.

20. The wearable system according to claim 11, wherein the wearable system further comprises an infrared light emitting diode (LED) and a display device, and a laser and an infrared cut-off filter are provided in the first camera;

the infrared LED is configured to transmit infrared light to cover the gesture working region;

the infrared cut-off filter is configured to perform filtering to obtain infrared light reflected from the gesture working region created by the processor;

the wearable system further comprises a second camera, a laser and an infrared cut-off filter are provided in the second camera, and the second camera and the first camera are configured to receive the reflected infrared light obtained by the infrared cut-off filter; and the instructions cause the processor to: generate a first gesture image according to the reflected infrared light received by the first camera, and generate a second gesture image according to the reflected infrared light received by the second camera; and perform a calculation on the first gesture image and the second gesture image to obtain the gesture image.

21. The wearable system according to claim 11, wherein the instructions cause the processor to: when determining that there is no light spot in the gesture image, re-adjust the shooting angle of the first camera, and then adjust the region of interest, so that there is a light spot in a newly collected gesture image, wherein the light spot is generated from laser light transmitted by a laser.

* * * * *

UNITED STATES PATENT AND TRADEMARK OFFICE
CERTIFICATE OF CORRECTION

PATENT NO. : 10,948,994 B2
APPLICATION NO. : 16/080589
DATED : March 16, 2021
INVENTOR(S) : Zhang Page 1 of 1

It is certified that error appears in the above-identified patent and that said Letters Patent is hereby corrected as shown below:

In the Claims

Column 16, Line 33, Claim 4, delete "= $C$," and insert -- = $C$; --.

Column 18, Lines 47-52, Claim 10, delete the equations and insert
-- $\phi=\sin^{-1}\{[X_{world}-d_x-\cos(\varphi-\theta)X_{camera}-\sin(\varphi-\theta)Z_{camera}]/l\}-\varphi$ or
$\phi=\cos^{-1}\{[Z_{world}-d_z+\sin(\varphi-\theta)X_{camera}-\cos(\varphi-\theta)Z_{camera}]/l\}-\varphi$, --.

Column 18, Line 54, Claim 10, delete "($X_{current}$, $Y_{current}$, $Z_{current}$)" and insert
-- ($X_{camera}$, $Y_{camera}$, $Z_{camera}$) --.

Column 18, Lines 57-61, Claim 10, delete "$l$ is a length of the camera, $d_x$ is a vertical distance between the camera and the gesture working region, and $d_z$ is a horizontal distance between the camera and the gesture working region" and insert -- $l$ is a length of the first camera, $d_x$ is a vertical distance between the first camera and the gesture working region, and $d_z$ is a horizontal distance between the first camera and the gesture working region --.

Column 19, Line 63, Claim 13, delete "= $C$," and insert -- = $C$; --.

Column 21, Lines 43-49, Claim 17, delete the equations and insert
-- $\phi=\sin^{-1}\{[X_{world}-d_x-\cos(\varphi-\theta)X_{camera}-\sin(\varphi-\theta)Z_{camera}]/l\}-\varphi$ or
$\phi=\cos^{-1}\{[Z_{world}-d_z+\sin(\varphi-\theta)X_{camera}-\cos(\varphi-\theta)Z_{camera}]/l\}-\varphi$, --.

Column 21, Line 51, Claim 17, delete
"($X_{current}$, $Y_{current}$, $Z_{current}$) and insert
-- ($X_{camera}$, $Y_{camera}$, $Z_{camera}$) --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*